United States Patent [19]
Manna

[11] 4,106,360
[45] Aug. 15, 1978

[54] INDEXED AND COWORKING GEARS

[75] Inventor: Albert Manna, Aurora, Ill.

[73] Assignee: Caterpillar Tractor Co., Peoria, Ill.

[21] Appl. No.: 782,666

[22] Filed: Mar. 30, 1977

[51] Int. Cl.² .................. F16H 55/18; B21D 53/28
[52] U.S. Cl. .................. 74/440; 29/159.2; 74/409
[58] Field of Search .......... 74/440, 445, 409, 413, 74/439; 29/159.2

[56] References Cited

U.S. PATENT DOCUMENTS

| | | | |
|---|---|---|---|
| 2,845,809 | 8/1958 | Hetzel | 74/440 |
| 2,868,033 | 1/1959 | Gaither | 74/440 |
| 3,385,126 | 5/1968 | Finch | 74/440 |
| 3,496,794 | 2/1970 | Forichon | 74/440 |

*Primary Examiner*—Leonard H. Gerin
*Attorney, Agent, or Firm*—Wegner, Stellman, McCord, Wiles & Wood

[57] ABSTRACT

A drive assembly and method of forming the same wherein indexed and coworking gears are provided having improved accurate meshed engagement. The drive assembly includes a first conjugate pair of indexed coworking gears and a second conjugate pair of indexed coworking gears adapted to have meshing engagement with the first pair. The first pair defines an assembly wherein the gears are fixedly coaxially secured and the second pair defines an assembly wherein the gears are initially loosely secured with one of the gears being disposed in meshed relationship to one of the gears of the first assembly. The second gear assembly is then moved relative to the first gear assembly so as to cause the other gear thereof to find accurate meshed association with the other gear of the first assembly whereupon the gears of the second assembly are firmly secured to have maintained accurate meshed association with both gears of the first gear assembly.

17 Claims, 7 Drawing Figures

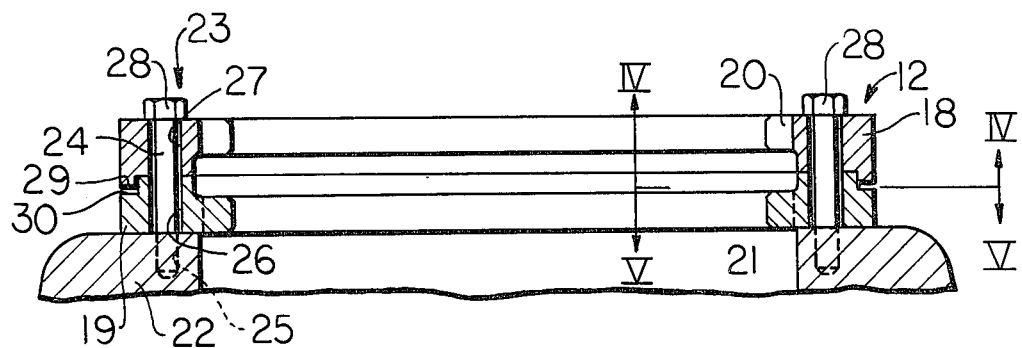
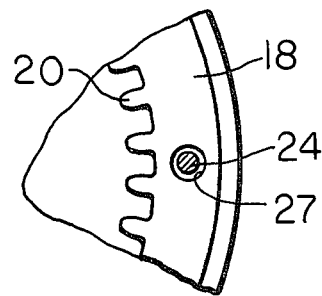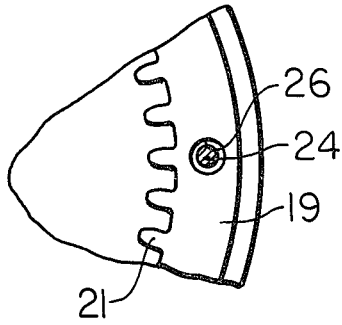

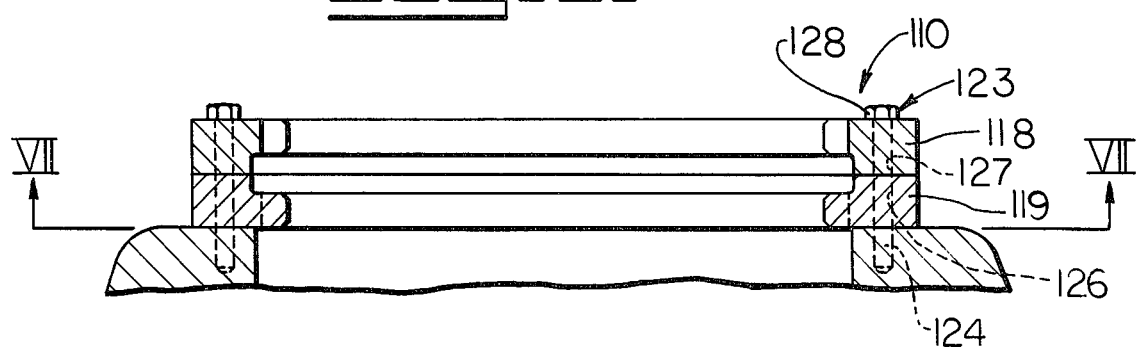
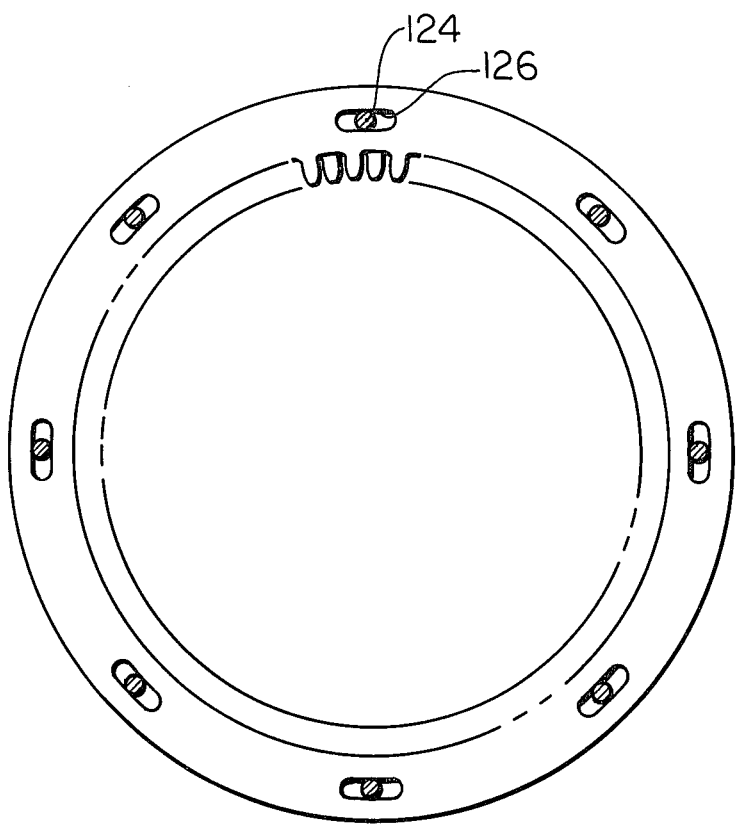

INDEXED AND COWORKING GEARS

BACKGROUND OF THE INVENTION

1. Field of the Invention

This invention relates to drive assemblies and in particular to gear drive assemblies.

2. Description of the Prior Art

As shown in U.S. Pat. No. 3,545,296 of Douglas W. Eggins, it has been conventional to provide a drive assembly wherein a large gear wheel is driven by split pinions which are relatively movable to each other to change the effective loading of the respective pinions as compensation for irregularities in the large gear wheel.

Frank Fagarazzi, in U.S. Pat. No. 3,648,534, shows an antilash gear mechanism including a helical driven gear adapted to remain in constant mesh with a helical driving gear and a helical antilash gear axially coaligned with the driven gear and loosely mounted on one side thereof so that relative angular movement may occur between the antilash and driven gears. Spring means are provided for opposing undesirable axial separation between the gears.

It has further been conventional to provide indexed coworking gears for shifting loads from a gear in a position along the line of action. Such indexing may conventionally have been accomplished by the use of spline hubs which have presented the problem of wear and backlash.

SUMMARY OF THE INVENTION

The present invention is directed to overcoming one or more of the problems as set forth above.

The present invention comprehends an improved drive assembly and method of forming the same wherein accurate meshed association of the pair of drive gear assemblies is effected in a novel and simple manner.

More specifically, the invention comprehends providing a first gear assembly having a first gear provided with a first plurality of teeth and a coworking, second gear fixedly coaxially juxtaposed to the first gear and having a second plurality of teeth indexed relative to the first plurality of teeth. A second gear assembly is provided including a third gear having a third plurality of teeth in meshed engagement with the first gear first plurality of teeth and a fourth gear adjustably coaxially secured in juxtaposed association to the third gear and having a fourth plurality of teeth adjustably indexed relative to the third plurality of teeth to have accurate meshed engagement with the second gear second plurality of teeth.

In the illustrated embodiments, the teeth of the first and second gears are indexed substantially one-half the circular pitch thereof so that maximum force transfer occurs approximately one-half pitch apart. As the third and fourth gears are correspondingly arranged in the adjusted set disposition thereof, improved maximum force transfer occurs every half pitch of the gears.

In the illustrated embodiments, one of the gear assemblies comprises a ring gear assembly and the other of the gear assemblies comprises a pinion gear assembly. While, as will be obvious to those skilled in the art, either of the gear assemblies may comprise the adjustable gear assembly, in the illustrated embodiment, the ring gear assembly comprises the adjustable gear assembly and the pinion gear assembly comprises a fixed gear assembly.

The fixed gear assembly may be formed of a pair of elements fixedly secured together as by welding. In the illustrated embodiment, the gears of the first gear assembly are friction welded together.

The gears of the adjustable gear assembly may be coaxially interfitted and loosely secured by threaded means, such as bolts, extending through openings in the gears and threaded into a support member so that final adjusted meshing relationship may be effected by suitable tightening of the bolts after the accurate association is determined.

In the illustrated embodiments, the fourth gear is caused to have accurate meshed association with the second gear by movement of the third gear relative to the first gear with the fourth gear loosely secured to the third gear. In the illustrated embodiment, the first and second gears comprise a pinion gear which may be moved around the ring gear defining the third and fourth gears so as to cause one of the gears of the ring gear to be displaced suitably to have accurate meshed association with the first gear assembly. The ring gear may be secured to a stationary support.

Thus, the drive assembly of the present invention is extremely simple and economical of construction with the method of forming the same being similarly extremely simple and economical.

BRIEF DESCRIPTION OF THE DRAWING

Other features and advantages of the invention will be apparent from the following description taken in connection with the accompanying drawing wherein:

FIG. 3 is an enlarged fragmentary section taken substantially along the line III—III of FIG. 1;

FIG. 4 is a fragmentary bottom plan view taken along the lines IV—IV of FIG. 3;

FIG. 5 is a fragmentary top plan view taken along the lines V—V of FIG. 3;

FIG. 6 is an enlarged fragmentary diametric section of another form of drive assembly embodying the invention; and FIG. 7 is a vertical section taken substantially along the lines VII—VII of FIG. 6.

DESCRIPTION OF THE PREFERRED EMBODIMENTS

Figure 1:
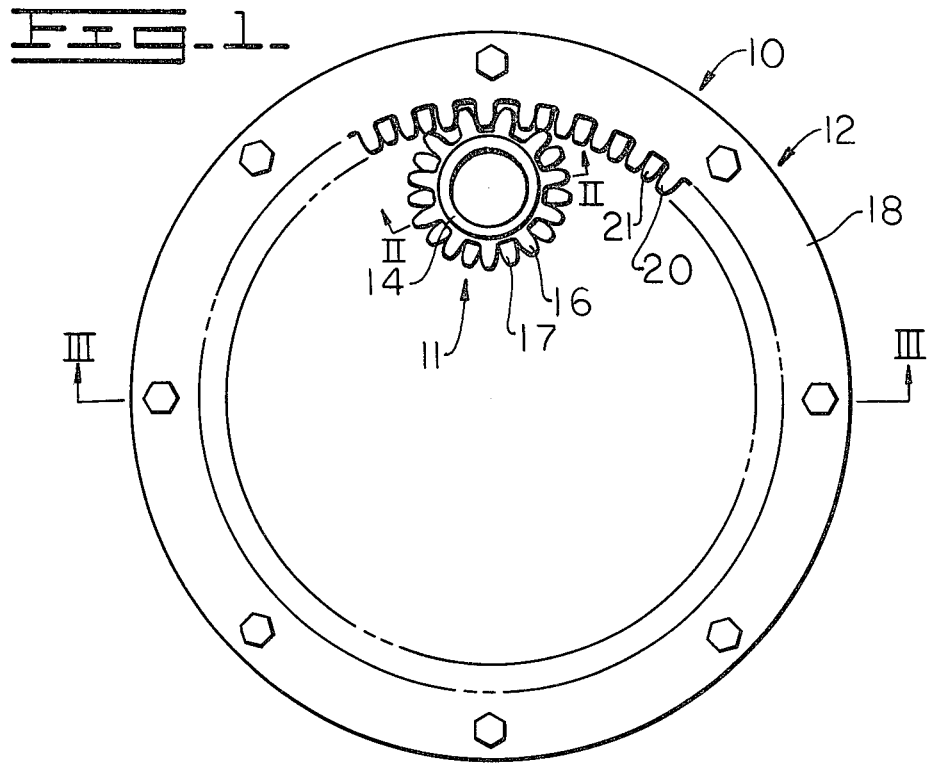
FIG. 1 is an elevation of a drive assembly embodying the invention.

In the exemplary embodiment of the invention as disclosed in FIGS. 1–5 of the drawing, a drive assembly generally designated 10 is shown to comprise a first gear assembly generally designated 12.

Figure 2:
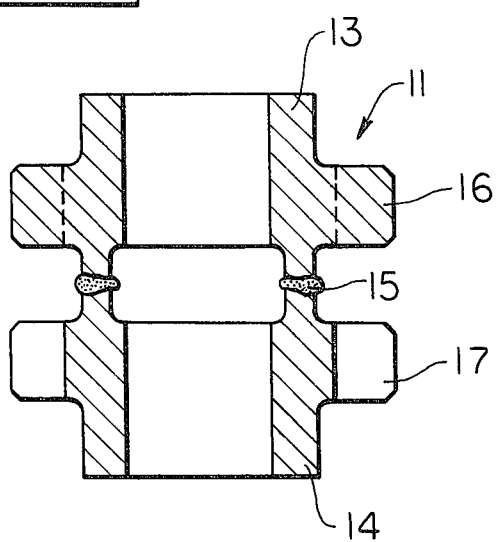
FIG. 2 is an enlarged diametric section taken substantially along the line II—II of FIG. 1.

As shown in FIG. 2, the first gear assembly may comprise a pinion gear assembly formed of a first pinion gear 13 and a second pinion gear 14 fixedly coaxially secured in juxtaposed disposition. In the illustrated embodiment, the first gear 13 is secured to the second gear 14 by welding, and more specifically by friction welding 15.

First pinion gear 13 defines a first plurality of gear teeth 16 and second pinion gear 14 defines a second plurality of gear teeth 17. As illustrated in FIGS. 1 and 2, gear teeth 16 are indexed relative to gear teeth 17, and more specifically, are indexed substantially one-half the circular pitch of gear teeth 17.

In the illustrated embodiment, the second gear assembly comprises a ring gear assembly including a first ring gear 18 and a second ring gear 19. First ring gear 18 is provided with a third plurality of teeth 20 and second ring gear 19 is provided with a fourth plurality of teeth 21. As further shown in FIG. 1, gear teeth 21 are indexed relative to gear teeth 20. Resultingly, gear teeth 20 of ring gear 18 mesh with gear teeth 17 of pinion gear 14 and ring gear teeth 21 mesh with gear teeth 16 of pinion gear 13.

In the illustrated embodiment, ring gear assembly 12 is fixedly secured to a stationary support 22 by means of a plurality of bolts 23. The threaded shank 24 of the bolts is threaded into suitable threaded recesses 25 in the supports 22 and passes through holes 26 in the ring gear 19. Bolt shank 24 may further pass through a complementary hole 27 in ring gear 18 whereby the head 28 may clamp against the ring gear 18 and force it against the ring gear 19 which, in turn, is forced against the stationary support 22 to mount the ring gear to the support.

Holes 26 and 27 may be slightly larger in cross section than the diameter of bolt shanks 24 to permit rotational adjustment of ring gear 19 relative to ring gear 18 so as to effect accurate indexing of the teeth 21 relative to the teeth 20. In the illustrated embodiment, such indexing is effected by movement of the first gear assembly 11 in meshed association with the second gear assembly 12 with the bolts 23 seated but not firmly set to permit such relative movement between the ring gears during movement of the first gear assembly. Thus, as the first gear assembly moves about the ring gear assembly 12, teeth 17 have meshed association with teeth 20 of the ring gear 18. Teeth 17 of the second pinion gear 14 may similarly have meshed association with the teeth 21 of the second ring gear 19. However, as the second ring gear 19 is loosely retained by the seated, but not firmly set, bolts 28, teeth 16 may adjust the indexing of second ring gear 19 so as to accurately index teeth 21 thereof relative to teeth 20 of the first ring gear 18 to cause accurate meshed association of both sets of ring gear teeth with both sets of pinion gear teeth.

In the illustrated embodiment, such accurate indexing of the teeth 21 relative to the teeth 20 may be effected by a single revolution of the pinion gear relative to the ring gear assembly 12 whereupon the bolts 25 may be firmly set by high torque application thereto, thereby accurately fixing the ring gear assembly for accurate continued meshed association with the pinion gear assembly.

As further shown in FIG. 3, ring gear 18 may be provided with a depending annular flange 29 fitted into an upwardly opening peripheral recess 30 in the second ring gear 19. The fitted association of flange 29 in the recess 30 provides a piloting, or coaxial rotatable association of the ring gears so that the loose fit of the bolt shanks 24 in the holes 26 and 27 permits movement of the ring gears relative to each other only in a rotational direction.

Turning now to the embodiment of FIGS. 6 and 7, a modified form of drive assembly generally designated 110 is shown to comprise a drive assembly generally similar to drive assembly 10 but having a modified arrangement of holes in the ring gears. More specifically, as shown in FIGS. 6 and 7, the first ring gear 118 may be provided with a plurality of cylindrical holes 127 and the second ring gear 119 may be provided with a plurality of circumferentially elongated slots 126. The diameter of the holes 127 and the radial width of the slots 126 may be closely similar to the outer diameter of the shanks 124 of the bolts 123 so as to maintain the ring gears 118 and 119 in coaxial relationship while permitting rotational adjustment by movement of the ring gear 118 rotationally relative to the ring gear 119 to carry the bolts 123 arcuately through the arcuate slots 126 to the desired adjusted position of the ring gear 118 relative to the ring gear 119.

Thus, drive assembly 110 is generally similar to drive assembly 10 in that the indexing of the two ring gears relative to the two pinion gears may be effected by a single revolution of the pinion gear relative to the ring gear assembly, permitting the bolts 123 to be set so as to secure the ring gears in accurate association with the pinion gear.

As will be obvious to those skilled in the art, the settable association of one gear with its conjugate gear may be provided with either of the pinion or ring assemblies as desired. As will also be obvious to those skilled in the art, while only two gears are shown as comprising each of the gear assemblies, any number of such gears may be utilized as desired within the scope of the invention.

The improved accurate indexing of the respective gears in the drive assemblies 10 and 110 provides an increased load-carrying capacity. Thus, the present invention reduces bending, pitting, scoring, and subsurface shear modes of failure which may occur with conventional gear structures.

The present invention is further adapted for use with wide gears which conventionally are subject to misalignment. Such gears require uneconomical crown shaving and the present invention permits the crown to be substantially obviated.

The use of inertia welding minimizes the cost of the pinion gear by avoiding expensive forging and similar forming methods.

The use of separate gears secured together to form the individual gear assembly permits gears of minimum axial extent to carry maximum loads.

The use of the indexed gears further reduces noise. The use of the relatively short axial lengths of the individual gears permits the facilitated heat treating thereof.

Thus, the present invention provides an improved drive assembly which may be readily and economically formed providing a number of substantial advantages over conventional drive assemblies. The present invention is adapted for transmitting high loads by means of relatively small gears and thus provides a further advantage in the drive assembly art.

The foregoing disclosure of specific embodiments is illustrative of the broad inventive concepts comprehended by the invention.

The embodiments of the invention in which an exclusive property or privilege is claimed are defined as follows:

1. In an assembly having a first gear assembly including a first gear having a first plurality of teeth, and a coworking second gear fixedly coaxially adjacent said first gear and having a second plurality of teeth indexed relative to said first plurality of teeth, the improvement comprising a second gear assembly including a third gear having
a third plurality of teeth in meshed engagement with said first gear first plurality of teeth, and a fourth gear adjustably coaxially secured adjacent to said third gear and having a fourth plurality of teeth adjustably indexed relative to said third plurality of teeth to have accurate meshed engagement with said second gear second plurality of teeth.

2. The drive assembly of claim 1 wherein said second plurality of teeth are indexed relative to said first plurality of teeth substantially one-half the circular pitch of said first plurality of teeth.

3. The drive assembly of claim 1 wherein one of said gear assemblies comprises a ring gear assembly and the other of said gear assemblies comprises a pinion gear assembly.

4. The drive assembly of claim 1 wherein said first and second gears comprise separate elements fixedly secured together.

5. The drive assembly of claim 1 wherein said first and second gears comprise separate elements fixedly welded together.

6. The drive assembly of claim 1 wherein said first and second gear comprise separate elements fixedly friction welded together.

7. The drive assembly of claim 1 wherein said third and fourth gears are adjustably secured together by threaded means.

8. The drive assembly of claim 1 wherein said third and fourth gears are adjustably secured together by a plurality of threaded elements.

9. The drive assembly of claim 1 wherein said third and fourth gears are adjustably secured together by a plurality of bolts extending through an arcuate slot in one of said third and fourth gears and a mounting hole in the other of said third and fourth gears.

10. The drive assembly of claim 1 wherein said third and fourth gears are adjustably secured together by a plurality of bolts extending through mounting holes in said third and fourth ring gears, the holes in at least one of said ring gears having a loose fit with said bolts.

11. The drive assembly of claim 1 further including a support member, said third and fourt gears being adjustably secured by bolts extending through said third and fourth gears and secured to said support member.

12. The method of assembly a drive assembly having a first gear assembly including a first gear having a first plurality of teeth, and a coworking second gear fixedly coaxially adjacent said first gear and having a second plurality of teeth indexed relative to said first plurality of teeth, and a second gear assembly including a third gear having a third plurality of teeth in meshed engagement with said first gear first plurality of teeth and a coworking fourth gear coaxially adjacent to said third gear and having a fourth plurality of teeth, said method comprising the steps of:

positioning the third gear in meshed association with the first gear;

loosely securing the fourth gear to the third gear;

causing the fourth gear to have accurate meshed association with said second gear; and tightly securing the fourth gear to the third gear.

13. The method of assembling a drive assembly of claim 10 wherein the third gear is caused to move in meshed association with the first gear to cause said loosely secured fourth gear to move into accurately meshed association with said second gear prior to the tight securing thereof.

14. The method of assembling a drive assembly of claim 10 wherein said fourth gear is loosely bolted to said third gear by application of low seating torque to the bolts, and is firmly bolted thereto by subsequent application of high setting torque thereto after the fourth gear is accurately meshed with the second gear.

15. The method of assembling a drive assembly of claim 12 wherein said first gear assembly comprises a pinion gear and said second gear assembly comrprises a ring gear, said pinion gear being run around the ring gear to effect said accurate meshing of said fourth gear with said second gear.

16. The method of assembling a drive assembly of claim 12 wherein said first and second gears are friction welded in secured relationship.

17. The method of assembling a drive assembly of claim 12 wherein said second gear assembly is fixedly secured to a stationary support by said bolts.

* * * * *